Patented Nov. 21, 1939

2,180,625

UNITED STATES PATENT OFFICE 2,180,625

MANUFACTURE OF LAMINATED GLASS

Frederic L. Bishop, Fox Chapel Manor, Pa., assignor to American Window Glass Company, Pittsburgh, Pa., a corporation of Pennsylvania No Drawing. Application May 6, 1933, Serial No. 669,741

14 Claims. (Cl. 49—81)

This invention relates to the manufacture of laminated glass, and provides an improved method of making the same which results in a product superior to those on the market at the present time.

Heretofore, laminated or strengthened glass has been manufactured by numerous processes and by the use of various materials as the strengthening medium to be interposed between the glass sheets and rigidly united thereto. Cellulose composition materials, such as cellulose nitrate and cellulose acetate, have been used extensively as the strengthening medium, and have been united to the glass sheets by various materials and by various processes.

The products manufactured by the various processes known heretofore have been objectionable in many respects. They have not been shock-resistant or non-shatterable at even the various temperatures encountered in normal usage. They are further objectionable in that they require sealing of the edges thereof. The present products will not stand up over a sufficiently long period of time, and let-goes or separations between the strengthening material and the glass will develop. Such let-goes or separations are objectionable in that they usually show a dull reflecting area. The present products are further objectionable in that they are subject to discoloration under normal conditions of use, due to the photochemical action of the ultra-violet rays of the sunlight on the strengthening material. In many instances, decomposition products are released from the plastic by heat, thereby forming vapors and resulting bubbles.

In order to overcome the objections above enumerated, it has been proposed to manufacture laminated glass by forming a film or layer of a solution of a strengthening material on the glass sheets, and to allow it to dry and to thereafter rigidly unite the glass sheets with the strengthening layer therebetween. In the copending application of Charles S. Shoemaker and Frederic L. Bishop, Serial No. 658,598, filed February 25, 1933, a process of manufacturing laminated glass in the above manner is disclosed. At the present time, the preferred strengthening material is an acrylic acid ester.

In carrying out the process, one of the steps of which comprises flowing a layer of a solution of a strengthening material on the glass sheets, considerable difficulty has been encountered by reason of the formation of bubbles in the final products. By my invention, I provide a method of manufacturing laminated glass wherein the principle of flowing a solution of a strengthening material on the glass sheets is utilized, and whereby the formation of bubbles in the finished product is substantially eliminated. This is highly desirable as bubbles in finished products are objectionable.

In accordance with my invention, I have found that bubbles can be eliminated by the application of heat either to the solution prior to the flowing thereof on the glass sheets, or to the glass sheets immediately prior to the formation of the strengthening layer thereon, or to both the solution and the glass sheets. Where the solution of the strengthening material alone is heated immediately prior to the formation of the coatings on the glass sheets, it should be heated to a temperature above the boiling point of the solvent or other liquid in the solution, so that upon the formation of the coating some of the solvent or other liquid will be liberated and force out bubbles in the layer of strengthening material. Where the glass sheet on which the solution of strengthening material is to be flowed alone is heated, the glass sheet must be raised to a temperature above the boiling point of the solvent or to the liquid in the solution, so as to force some of the solvent or other liquid out of the layer of strengthening material after it is formed thereon. Where both the glass sheet and the solution are heated, it is necessary that sufficient heat be supplied to them to boil off a portion of the solvent or other liquid in the solution.

In carrying out my invention, the glass sheets to be united are mechanically or chemically cleaned. The solution comprising a solvent and a strengthening material, preferably an acrylic acid ester, or the glass sheets are heated prior to the time that the solution is flowed on the glass sheets. The heated solution is thereafter flowed on the glass sheets to be united and the layer of strengthening material permitted to dry, and two sheets so treated placed together with the layers of strengthening material in juxtaposed relationship, and rigidly united. The union of the coated sheets may be effected in any desirable manner, such as by the application of pressure in the presence of heat.

It will be understood that in order to obtain a suitable product, it is unnecessary to use two coated glass sheets in the formation of the composite product. One coated glass sheet may, of course, be united to a second uncoated glass sheet with the layer of strengthening material between the sheets.

It will be understood, of course, that the advantages of my invention may be obtained by heating either the glass sheets or the solution, or both, in the manner above described.

While I have described several ways in which my improved method of manufacturing laminated glass may be carried out, it will be understood that I do not intend to be limited thereby, and that the invention may be otherwise practiced within the scope of the following claims.

I claim:

1. In the manufacture of laminated glass, the steps comprising heating a solution of a strengthening material to substantially the boiling point of the solvent therein, forming a layer of the heated solution on a glass sheet, drying the layer of strengthening material, and thereafter rigidly uniting said coated glass sheet to a second glass sheet with the layer of strengthening material therebetween.

2. In the manufacture of laminated glass, the steps comprising heating a solution of a strengthening material to a temperature above the boiling point of a liquid in the solution, forming a layer of the heated solution on a glass sheet, drying the layer of strengthening material, and thereafter rigidly uniting said coated glass sheet to a second glass sheet with the layer of strengthening material therebetween.

3. In the manufacture of laminated glass, the steps comprising heating a solution of a strengthening material comprising an acrylic acid ester and a solvent therefor to substantially the boiling point of the solvent, forming a layer of the heated solution on a glass sheet, drying the layer of strengthening material, and thereafter rigidly uniting said coated glass sheet to a second glass sheet with the layer of strengthening material therebetween.

4. In the manufacture of laminated glass, the steps comprising heating a solution comprising a strengthening material and a solvent therefor to above the boiling point of the solvent, forming a layer of the heated solution on a glass sheet, drying the layer of strengthening material, and thereafter rigidly uniting said coated glass sheet to a second similarly coated glass sheet with the strengthening layers juxtaposed.

5. In the manufacture of laminated glass, the steps comprising heating a solution comprising a strengthening material and a solvent therefor to the boiling point of the solvent or other liquid in the solution, forming a layer of the heated solution on a glass sheet, drying the layer of strengthening material, and thereafter rigidly uniting said coated glass sheet to a second glass sheet with the layer of strengthening material therebetween.

6. In the manufacture of laminated glass, the steps comprising heating a solution comprising an acrylic acid ester and a solvent therefor to at least the boiling point of the solvent or other liquid in the solution, forming a layer of the heated solution on a glass sheet, drying the layer of strengthening material, and thereafter rigidly uniting said coated glass sheet to a second glass sheet with the layer of strengthening material therebetween.

7. In the manufacture of laminated glass, the steps comprising heating a glass sheet, forming a layer of a solution of a strengthening material on said heated glass sheet, said sheet being heated to at least the boiling point of the solvent in said solution, drying the layer of strengthening material, and thereafter rigidly uniting said coated glass sheet to a second glass sheet with the layer of strengthening material therebetween.

8. In the manufacture of laminated glass, the steps comprising heating a glass sheet, forming a layer of a solution of a strengthening material on said heated glass sheet, said sheet being heated to at least the boiling point of the solvent in said solution, drying the layer of strengthening material, and thereafter rigidly uniting said coated glass sheet to a second similarly coated glass sheet with the layer of strengthening material therebetween.

9. In the manufacture of laminated glass, the steps comprising heating a glass sheet, forming a layer of a solution comprising an acrylic acid ester and a solvent on said heated glass sheet, said sheet being heated to at least the boiling point of the solvent, drying the layer of strengthening material, and thereafter rigidly uniting said coated glass sheet to a second similarly treated glass sheet with the strengthening layers in juxtaposed relationship.

10. In the manufacture of laminated glass, the steps comprising heating a glass sheet to a temperature approximating the boiling point of a solvent or other liquid in a solution of a strengthening material to be flowed thereon, forming a layer of a solution comprising a strengthening material and a solvent therefor on said heated glass sheet, drying the layer of strengthening material, and thereafter rigidly uniting said coated glass sheet to a second glass sheet with the layer of strengthening material therebetween.

11. In the manufacture of laminated glass, the steps comprising heating a solution comprising a strengthening material and a solvent therefor, heating a glass sheet, forming a layer of said heated strengthening material on said heated glass sheet, drying the layer of strengthening material, and thereafter uniting said coated glass sheet to a second glass sheet with the layer of strengthening material therebetween.

12. In the manufacture of laminated glass, the steps comprising heating a solution comprising a strengthening material and a solvent therefor, heating a glass sheet, forming a layer of said heated strengthening material on said heated glass sheet, said glass sheet and said strengthening material being heated to a temperature sufficient to drive off a portion of the solvent or other liquid in the solution, drying the layer of strengthening material, and thereafter uniting said coated glass sheet to a second glass sheet with the layer of strengthening material therebetween.

13. In the manufacture of laminated glass, the steps comprising heating a solution comprising a strengthening material and a solvent therefor, heating a glass sheet, forming a layer of said heated strengthening material on said heated glass sheet, said glass sheet and said strengthening material being heated to a temperature sufficient to drive off a portion of the solvent or other liquid in the solution, drying the layer of strengthening material, and thereafter uniting said coated glass sheet to a second similarly coated glass sheet with the layer of strengthening material therebetween.

14. In the manufacture of laminated glass, the steps comprising heating a solution of a strengthening material to a sufficient extent to remove bubbles therefrom, thereafter forming a layer of the heated solution on a glass sheet, drying the layer of strengthening material, and thereafter rigidly uniting said coated glass sheet to a second glass sheet with the layer of strengthening material therebetween.

FREDERIC L. BISHOP.